US008567643B2

(12) United States Patent
Solera et al.

(10) Patent No.: US 8,567,643 B2
(45) Date of Patent: Oct. 29, 2013

(54) DEVICE AND METHOD TO DELIVER FLUID PRODUCTS

(75) Inventors: Giuliano Solera, Gavello di Mirandola (IT); Daniele Dall'Olio, Massa Finalese (IT); Leopoldo Mazzalveri, Cento (IT)

(73) Assignee: CPS Color Equipment SpA Con Unico Socio, San Felice Sul Panaro (IT)

( * ) Notice: Subject to any disclaimer, the term of this patent is extended or adjusted under 35 U.S.C. 154(b) by 55 days.

(21) Appl. No.: 13/387,999

(22) PCT Filed: Jul. 30, 2010

(86) PCT No.: PCT/EP2010/061093
§ 371 (c)(1), (2), (4) Date: Mar. 1, 2012

(87) PCT Pub. No.: WO2011/012692
PCT Pub. Date: Feb. 3, 2011

(65) Prior Publication Data

US 2012/0145263 A1 Jun. 14, 2012

(30) Foreign Application Priority Data

Jul. 31, 2009 (IT) .................................. UD09A0140

(51) Int. Cl.

| | |
|---|---|
| ***B67D 7/78*** | (2010.01) |
| ***B67D 7/06*** | (2010.01) |
| ***B65D 37/00*** | (2006.01) |
| ***B65D 88/54*** | (2006.01) |
| ***G01F 11/00*** | (2006.01) |

(52) U.S. Cl.
USPC ......... 222/144; 222/144.5; 222/207; 222/333

(58) Field of Classification Search
USPC ........ 222/144, 145.5, 145.6, 145.7, 207, 214, 222/333
See application file for complete search history.

(56) References Cited

U.S. PATENT DOCUMENTS

| | | | | |
|---|---|---|---|---|
| 4,817,688 A * | 4/1989 | Corniea | ........................ | 141/140 |
| 4,869,397 A * | 9/1989 | Corniea et al. | .................. | 222/63 |
| 4,903,740 A * | 2/1990 | Corniea et al. | .................... | 141/1 |
| 5,638,986 A * | 6/1997 | Tuominen et al. | ................ | 222/1 |

(Continued)

FOREIGN PATENT DOCUMENTS

| | | |
|---|---|---|
| EP | 0299592 | 1/1989 |
| EP | 0494375 | 7/1992 |

(Continued)

*Primary Examiner* — Paul R Durand
*Assistant Examiner* — Benjamin R Shaw
(74) *Attorney, Agent, or Firm* — Hamre, Schumann, Mueller & Larson, P.C.

(57) ABSTRACT

Device to deliver fluid products or suchlike, comprising a plurality of canisters, each one suitable to contain a predetermined fluid, and connected to an associated delivery unit. Each delivery unit comprises a bellows pump, alternatively drivable between a condition in which it sucks in the fluid from the corresponding canister and a condition in which it delivers the fluid. The delivery device also comprises actuator means able to cooperate directly or indirectly with each bellows pump in order to drive it between the suction condition and the delivery condition. The actuator means comprise a acutation cam element, rotatable alternatively in two opposite directions of rotation, and having a profile able to cooperate during its rotation with the bellows pump, so as to define in a first direction of rotation the suction condition and in the opposite direction of rotation the delivery condition.

16 Claims, 10 Drawing Sheets

(56) References Cited

U.S. PATENT DOCUMENTS

| | | | | |
|---|---|---|---|---|
| 2004/0149776 | A1 * | 8/2004 | Feygin et al. | 222/144 |
| 2004/0159676 | A1 * | 8/2004 | Adema | 222/144 |
| 2005/0194403 | A1 * | 9/2005 | Mink et al. | 222/135 |
| 2007/0056989 | A1 * | 3/2007 | Adema | 222/144 |
| 2007/0138203 | A1 * | 6/2007 | Sacchet | 222/144 |
| 2009/0130532 | A1 | 5/2009 | Yokozawa et al. | |

FOREIGN PATENT DOCUMENTS

| | | |
|---|---|---|
| EP | 1584478 | 10/2005 |
| GB | 1353014 | 5/1974 |
| WO | 02/05968 | 1/2002 |

* cited by examiner

DEVICE AND METHOD TO DELIVER FLUID PRODUCTS

FIELD OF THE INVENTION

The present invention concerns a device to deliver fluid products or suchlike, such as for example colorants, food products or other, and the relative delivery method.

In particular, the delivery device according to the present invention is suitable to selectively deliver fluid products or suchlike such as colorants of different shades or color, able to be dosed and/or added to a base substance so as to form a paint or varnish, using bellows delivery pumps.

US 2005/0194403 discloses a fluid dispenser having the features of the preamble of the main claims 1 and 11.

BACKGROUND OF THE INVENTION

Delivery devices are known, for dispensing fluid products, semi-fluids, pastes, gels, creams such as for example colorants, food products or other. Known delivery devices comprise a plurality of containers, or canisters, each suitable to contain a predetermined fluid, colorant or food product, and connected to an associated delivery unit, such as a piston or bellows pump.

The canisters, and the associated delivery units, are mounted on a rotating table suitable to rotate so as to position said delivery units, according to a predetermined sequence, in correspondence with a delivery position. In the delivery position, a specific delivery unit is selectively activated to deliver, in the desired quantity, the fluid of the corresponding containing canister toward an exit container, allowing it to be filled with one or more of said fluids to obtain a fluid with a desired composition and/or formula.

Each canister is also usually provided with mixing means, such as for example a blade, directly or indirectly connected to a movement member that determines the rotation of the table. Alternatively, the mixing means of each canister are coupled with a corresponding actuator, said actuators being commandable independently of each other or in groups. The mixing means are suitable to mix the fluids, also during the movement of the rotating table, so as to keep them in optimum conditions and prevent any unwanted sedimentation or separation thereof.

One disadvantage of known delivery devices—based for example on the piston pump delivery technology—is that they do not have good precision and repeatability of delivery, especially when dispensing small quantities of fluids, corresponding for example to fractions of the quantity delivered for every travel of the plunger or piston.

For example, in the case of micro-volumetric deliveries for the composition of predetermined formulas of colorants, it is necessary to provide a delivery resolution at least equal to a few microliters, which is not always obtainable. Moreover, also due to delivery deviations or offsets, as the number of machine cycles effected increases it is not always possible to precisely deliver the fractions of fluid desired.

Another disadvantage of known delivery devices is that they are rather expensive, as they have to provide a plurality of actuators to mix the color in each canister. This entails a greater probability of mechanical breakdowns and therefore higher production costs and prolonged machine downtimes if a mixer breaks.

One purpose of the present invention is to achieve a device to deliver fluid products which allows to obtain a high delivery precision in every operating condition.

Another purpose of the present invention is to achieve an extremely simple delivery device, both in construction and in assembly, and also in functioning, reducing the motorizations, drives and transmissions to a minimum and hence the possible causes of breakdowns and wear.

Another purpose of the present invention is to achieve a delivery device which allows to reduce its costs, including maintenance costs.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a device to deliver fluid products according to the present invention comprises a plurality of canisters, each suitable to contain a predetermined fluid and connected to an associated delivery unit. Each delivery unit comprises a corresponding bellows pump drivable alternatively between a suction or loading condition, to load the fluid from the corresponding canister so as to fill a delivery circuit, and a condition in which the fluid is delivered.

The device comprises actuator means able to cooperate, directly or indirectly, with each bellows pump so as to drive it between said suction condition and said delivery condition.

According the present invention, the actuator means comprise an actuation cam element, rotatable alternatively in two opposite directions of rotation, and having a profile able to cooperate during its rotation with the bellows pump, so as to define in a first direction of rotation said suction condition, and in the opposite direction of rotation said delivery condition.

In other words the profile of the actuation cam element, by rotating, determines a mechanical interference with an actuator element of the bellows pump, determining the progressive passage from the inactive condition to a condition of complete suction and, rotating in the opposite direction, to a position of complete delivery.

According the invention, the two conditions are defined by a rotation of the actuation cam element by 180° in the first direction of rotation and subsequently by 180° in the opposite direction.

These two conditions of rotation define respective limit conditions of the bellows pump, i.e. the condition of bellows empty and the condition of bellows full with its nominal capacity, for example 5 cc of fluid product.

According to the present invention, the actuation cam element is provided with a shaped portion able to define, during its rotation, an operating condition of extra travel, or extra stroke, of the bellows pump, beyond the normal travel of 180°, in order to deliver predetermined fractions of fluid greater than the nominal capacity of the bellows pump, and/or to compensate for operating and/or working deviations in the delivery capacity of the delivery unit.

In a preferred embodiment, the angle of extra travel is 15-30°, so as to obtain a total angle of rotation of 195-210° before inverting the direction, wherein the condition of suction or, respectively, delivery, is maintained.

In other words, the extra travel of the actuation cam element beyond its nominal limit positions allows first to suction and then to deliver quantities of fluid product corresponding to a predetermined fraction of the quantity that can be delivered for every useful travel of the cam, in this way increasing the flexibility and accuracy in terms of formulating the recipe of the fluid product obtainable. This allows to complete the dosing for small fractions of volume exceeding the nominal value of the individual travel of the bellows, thus avoiding the need for another travel of the bellows in order to complete these small and critical quantities.

For example, if the nominal capacity of the bellows is 5 cc, and the device must dispense 5 cc, the actuation cam element rotates of 180° to deliver, and then 180° in the opposite direction for the suction of a new amount of fluid product.

If the device must dispense 20 cc, the actuation cam element rotates 4 times to 180° in both directions to alternatively deliver and suction the fluid product.

If the device must dispense a fraction of 5 cc, for example 5.4 cc, the actuation cam element can rotate for 195° since its shaping surface allows to continue the rotation over the 180° position maintaining the condition of delivering, without the need to make a further complete cycle of rotation in one direction and in the other to respectively suction and deliver a very small amount of fluid product, such as 0.4 cc.

According to the present invention, the delivery device comprises a rotating support on which said plurality of canisters is mounted. The support rotates, in a known manner, so as to position sequentially at different moments of time and according to one or more predetermined sequences, the desired and selected delivery unit in a corresponding delivery position, in order to deliver predetermined quantities of fluid in an exit container so as to obtain a final product with a desired final composition and/or formula.

According to one solution of the present invention, in a known manner, the device comprises mixing means able to mix the fluids contained in the canisters. The device also comprises a movement member, able to move the mixing means.

According to another variant, the movement member comprises a mixing cam element, substantially circular, concentric to said rotating support and rotatable with respect thereto in at least a reciprocal condition of release between the rotating support and the second cam element. The mixing cam element is provided with at least a shaping able to cooperate, during its rotation, with all the mixing means of each canister, so that when it is activated in rotation it determines the activation of all the mixing means of the fluid products inside all the canisters.

According to a variant of the invention, this activation in rotation of the mixing cam element occurs with the rotating support stationary, whereas, when the rotating support is activated to position the canisters in the delivery position, the cam is advantageously made solid therewith, in order to rotate with it.

According to another variant of the present invention, the shaping develops on an external or internal peripheral edge of the second cam element.

In this embodiment, according to another variant, the mixing cam element has a gear on its internal edge or on an intermediate profile, able to selectively engage a toothed wheel so as to activate the rotation thereof, independently of the rotation of the rotating support.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 1:
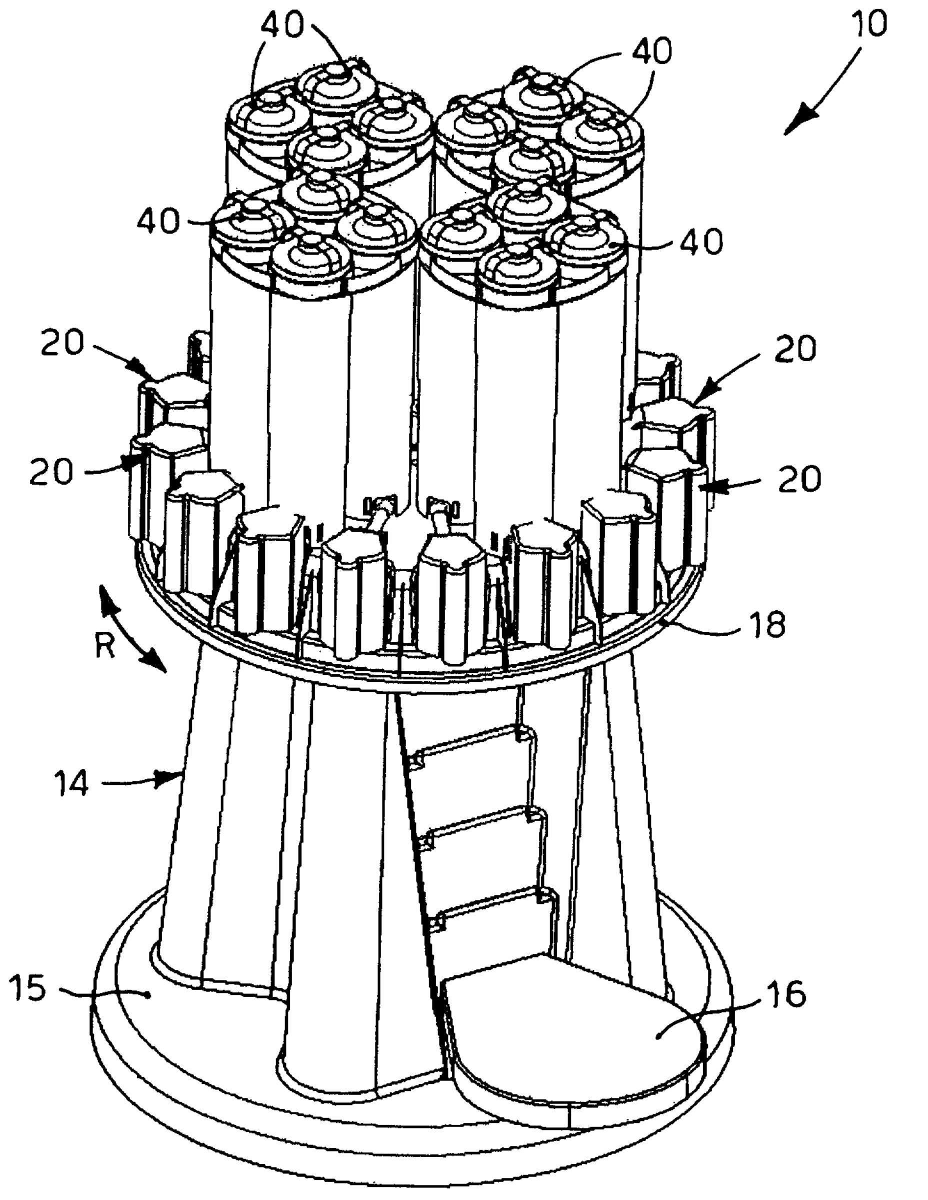
FIG. 1 is a perspective view of a delivery device according to the present invention.

With reference to the attached drawings, a delivery device 10 according to the present invention comprises a rotating table 18, or support, and a plurality of delivery units 20 distributed on the table 18, each provided with a bellows pump 22 and an actuation cam element 30. The delivery unit 10 also comprises a plurality of canisters 40, to contain a corresponding colorant to be delivered, each hydraulically connected by means of a feed pipe to a corresponding delivery unit 20. The device 10 also comprises a mixing cam element 42, suitable to cooperate with each canister 40 to mix the colorant contained therein.

The circular rotating table 18 is supported in a known manner by a column 14 which in turn rests on or is attached to the floor by means of a base 15. The table 18 can be moved in two opposite direction of rotation, as indicated by the arrow “R”, around an axis of rotation orthogonal to the table 18.

The rotation of the table 18 is effected by a drive unit, not shown, for example by means of a direct current motor, the functioning of which is commanded by a control and processing unit of a known type, in coordination with one or more specific delivery sequences. The motor can possibly be associated with one or more motor reducer devices.

The control and processing unit can set the rotation in one direction or the other in order to reduce the distance traveled by the individual delivery units 20 selected to move into the delivery position.

It is understood that the table 18 can be moved by means of a step motor, a brushless motor, a linear motor or any other type of suitable motor.

The canisters 40 of colorant are disposed on a support plane of the table 18 in a predetermined disposition. In this case there are sixteen delivery units 20, and sixteen canisters 40.

Advantageously the canisters 40 are grouped in modules of four, each module being made by molding in a single piece, in a substantially quadrangular disposition, so that two canisters of each group are disposed on a first circumference and two canisters of each group are disposed on a second circumference, concentric to the first and having a smaller radius. This solution allows to considerably reduce production costs of the canisters 40, simplifying installation operations and therefore reducing the relative maintenance times and costs.

Figure 9A:
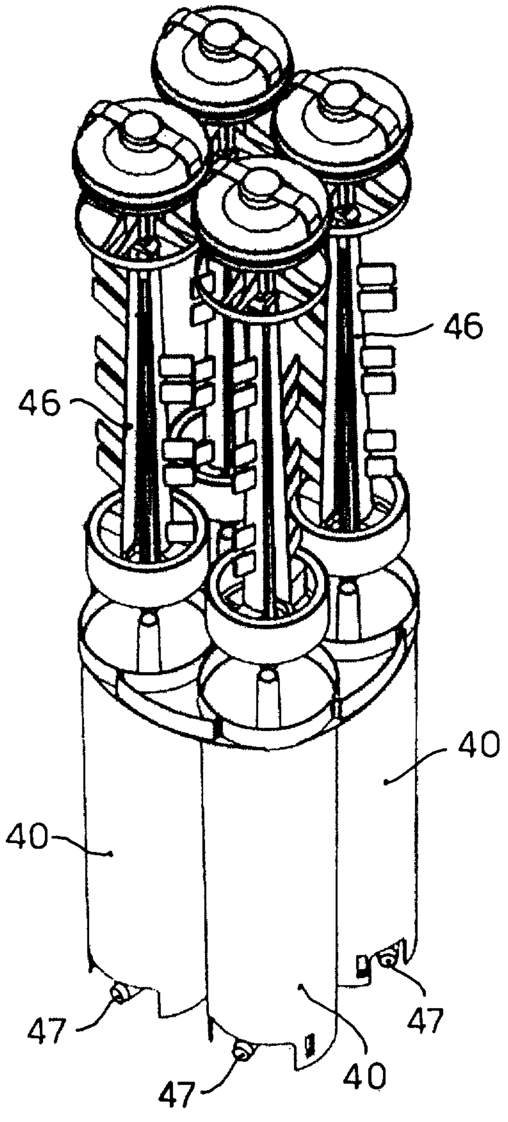
FIG. 9A is an exploded perspective view of a group of canisters of the device in FIG. 1.
Figure 9B:
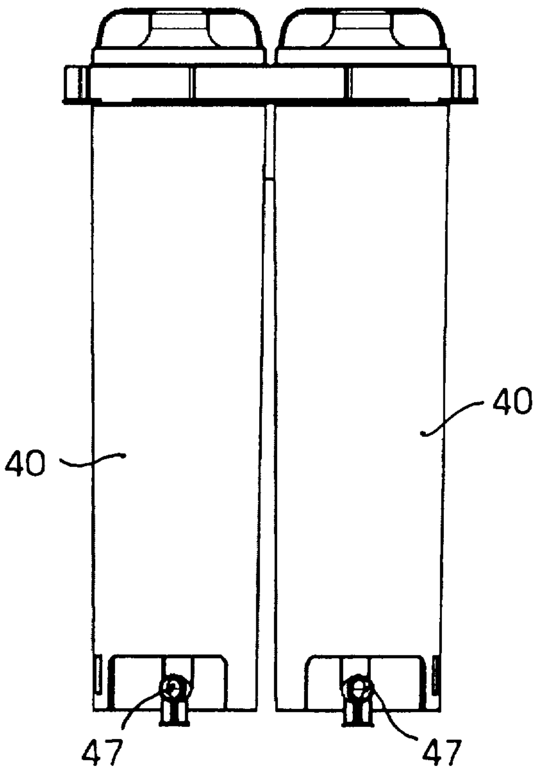
FIG. 9B is a lateral view of FIG. 9A.

Each canister 40, substantially cylindrical in shape (FIGS. 9A and 9B) is provided with one or more mixing blades 46, rotating around an axis coinciding with the axis of the canister, and with an outlet pipe 47 to deliver colorant to a corresponding delivery unit 20. Each canister 40 is also provided at one end with a butterfly element 41 suitable to allow the rotation of the blades 46.

Each butterfly element 41 (FIGS. 10A and 10B) is provided with upper 41*a* and lower 41*b* fins, disposed regularly in a radial manner and offset in height, and suitable to cooperate with the mixing cam element 42 as will be described in more detail hereafter.

The delivery units 20 (FIG. 1) are disposed on a peripheral edge of the table 18 so as to be distributed substantially regularly along the corresponding circumference.

The device 10 also comprises a delivery seating having a platform 16, disposed on a front portion of the column 14, suitable to house a container, not shown, into which the colorants are delivered according to said sequences.

Figure 2B:
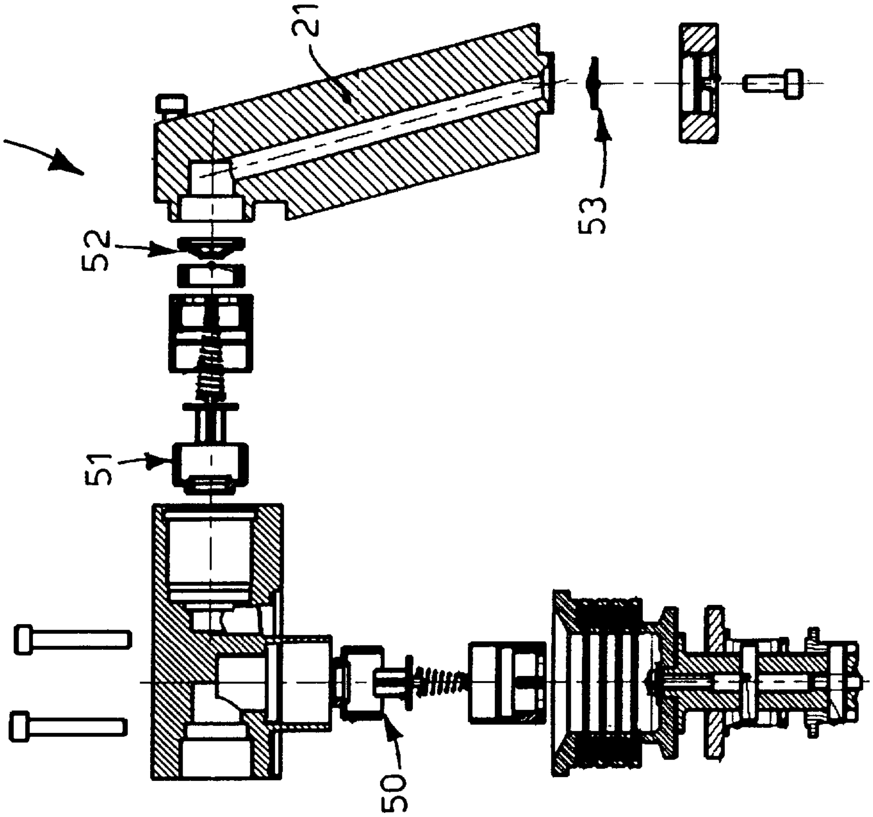
FIG. 2B is an exploded view in section of the delivery unit in FIG. 2A.
Figure 2A:
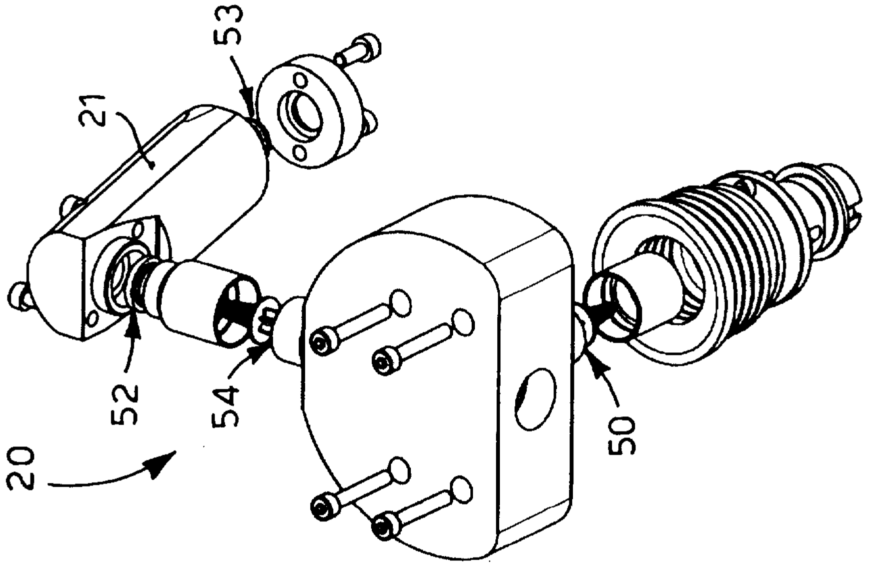
FIG. 2A is an exploded perspective view of a delivery unit of the device in FIG. 1.

Each delivery unit 20 is also provided (FIGS. 2A and 2B) with a delivery nozzle 21 to deliver the colorant, and with four valves to regulate suction and delivery of the colorant. In this case, the delivery unit comprises a suction valve 50, to take the colorant into the bellows pump 22, a delivery valve 51 to deliver the colorant from the bellows pump 22, an anti-drip valve 52 suitable to prevent unwanted drips at the end of a delivery cycle and an anti-drying valve 53, suitable to prevent the thickening and/or drying of possible residual colorant in the delivery circuit of the delivery unit. Other details shown in FIGS. 2A and 2B, which are not essential for the description and the comprehension of the present invention, are not indicated or described.

Each bellows pump 22 is drivable alternatively between a suction or loading condition, to load the colorant from the corresponding canister 40, and a delivery condition. Each pump 22 is operatively connected to the actuation cam element 30 to allow it to be driven between said suction and delivery conditions.

Figure 5:
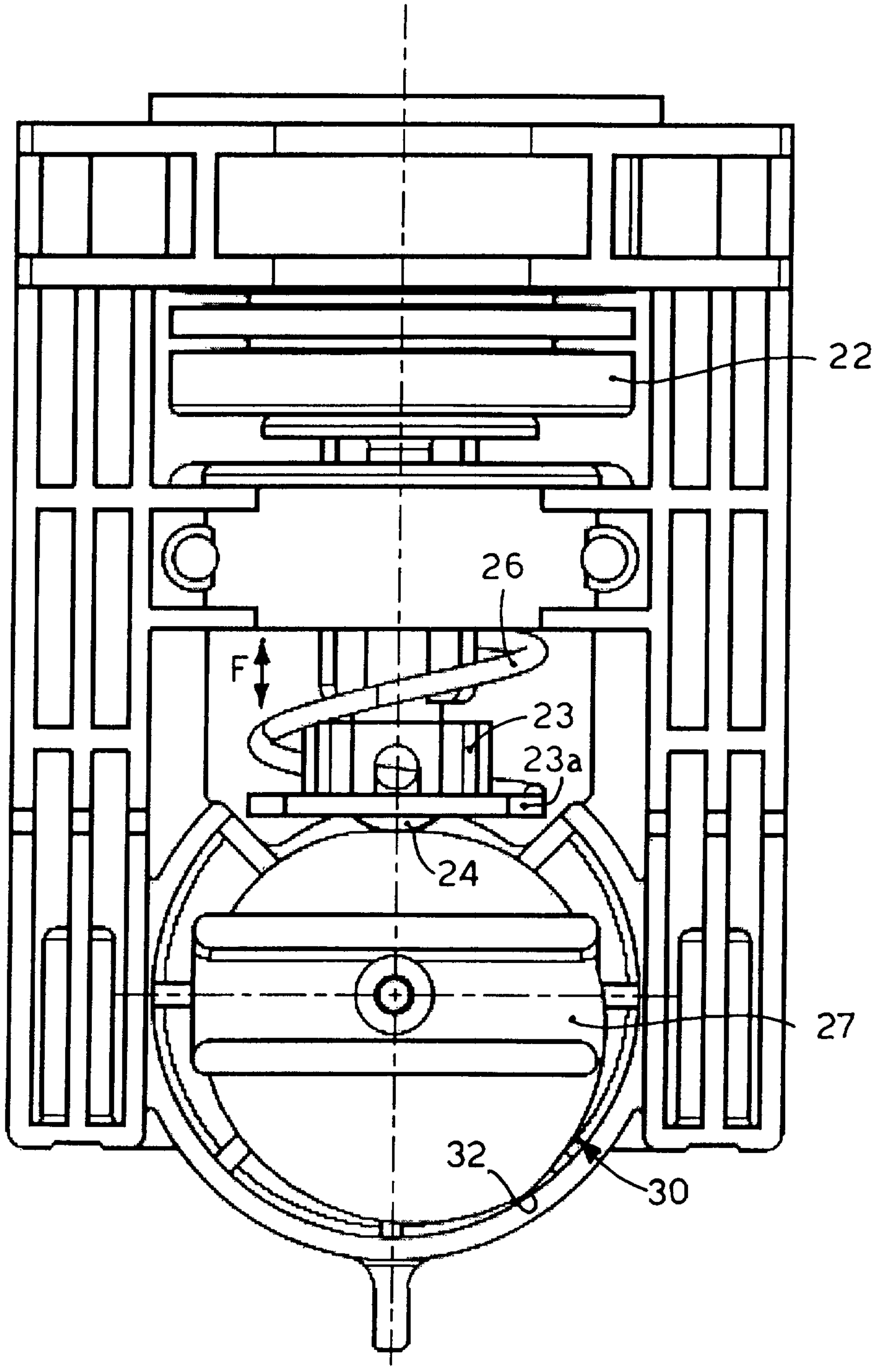
FIG. 5 is an enlarged view of a detail of the delivery unit in a first operating condition.

In this case, the actuation cam element 30 (FIGS. 5-7) is substantially eccentric in shape and is rotatably pivoted so as to be rotated alternatively by 180° between two opposite directions of rotation, each direction of rotation achieving a corresponding condition of suction or delivery.

The actuation cam element 30 is mechanically connected to one end of the bellows pump 22 by means of a transmission element 23, axially mobile in the axial direction of the bellows pump 22, and provided with a wheel 24 able to cooperate, by mechanical interference, with an eccentric lateral profile of the actuation cam element 30 during its rotation. The transmission element 23 is attached to a lower end of the bellows 22 and is also coupled to a contrasting spring 26, interposed between a fixed portion of the delivery unit 20 and a peripheral protuberance 23*a* thereof which develops in an annular manner at a lower end.

Therefore, by means of the continuous contact between the wheel 24 and the profile of the actuation cam element 30, the transmission element 23 transforms the alternate rotational motion of the actuation cam element 30 into an alternate linear motion of the bellows pump 22 so as to achieve said operating conditions.

The actuation cam element 30 is also provided with a shaped portion 32 suitable to define, during its rotation, an operating condition of extra travel of the bellows pump 22.

In particular, the shape of the portion 32 is configured so as to allow to continue the rotation for a further angle, for example of 15°, so as to obtain a total angle of rotation of 195° before inventing the direction, wherein the condition of suction or, respectively, delivery, is maintained.

In this way it is possible to deliver predetermined fractions of fluid, for example in excess of the nominal capacity of the pump 22, without having to effect a complete new cycle of suction and delivery of the missing fraction, and/or to compensate possible operating and/or working offsets of the delivery unit 20. Such offsets are due for example to an ageing of the components after a large number of operating cycles or to variations in the environmental operating conditions. This allows to always keep the same capacity and precision in delivering the colorant even after many delivery cycles.

Figure 3:
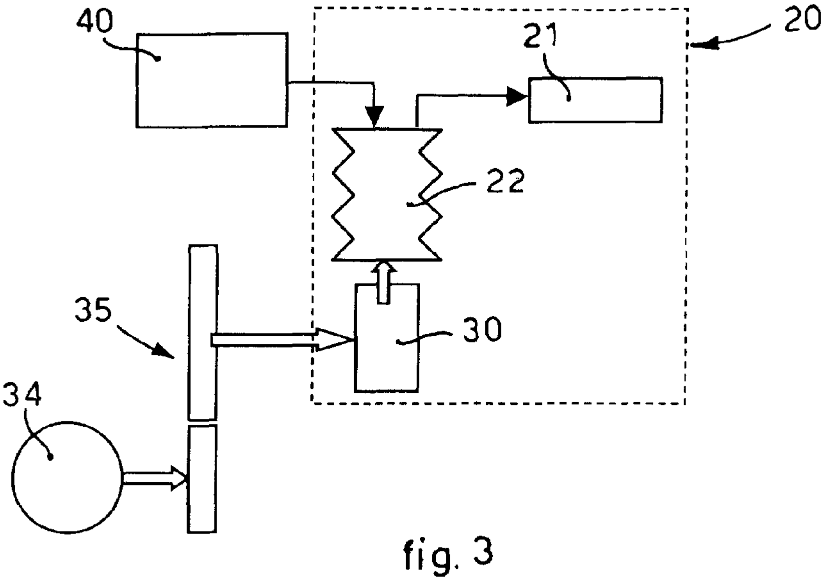
FIG. 3 is a block diagram of the delivery unit in FIG. 2 associated with a drive unit.

The actuation cam element 30 is also able to be operatively coupled (FIG. 3) with a drive motor 34 when the corresponding delivery unit 20 is positioned, by the rotation of the table 18, in correspondence with the platform 16.

In this case the actuation cam element 30 is provided with a gear element 27, solid therewith, and able to cooperate with actuation arms 36 moved by the motor 34 so as to be moved and therefore determine the rotation of the actuation cam element 30.

The gear element 27, substantially oblong and U-shaped, is disposed horizontally when the actuation cam element 30 is in an inactive position, or at least, when its delivery unit 20 is not delivering colorant, so as not to interfere with the actuation arms 36 during the rotation of the table 18 to position a predetermined unit 20 in the delivery position.

Advantageously the motor 34 is an electric step motor (FIG. 3) coupled with a gear transmission 28 in turn associated with the actuation cam element 30.

In one constructional embodiment the nominal volume of the bellows pump 22 is about 5 cc and its linear travel is about 6 mm. The reduction ratio of the gear transmission is 8:1 which with a step motor with a control of 400 half steps allows to obtain a delivery resolution of about 5 cc/1600 half steps, equal to 0.003125 cc, at least double the delivery resolution of commonly used standard bellows pumps.

The mixing cam element 42, substantially annular in shape, is disposed concentric to the rotating table 18, below a support plane on which the canisters 40 are disposed. The mixing cam element 42 is rotatable together with the table 18, also independently from it by means of an actuation member, not shown.

Advantageously, the mixing cam element 42 is provided with a gear, not shown, provided on an internal edge, able to be selectively connected with said actuation member when for example the rotating table 18 is stationary.

Figure 10A:
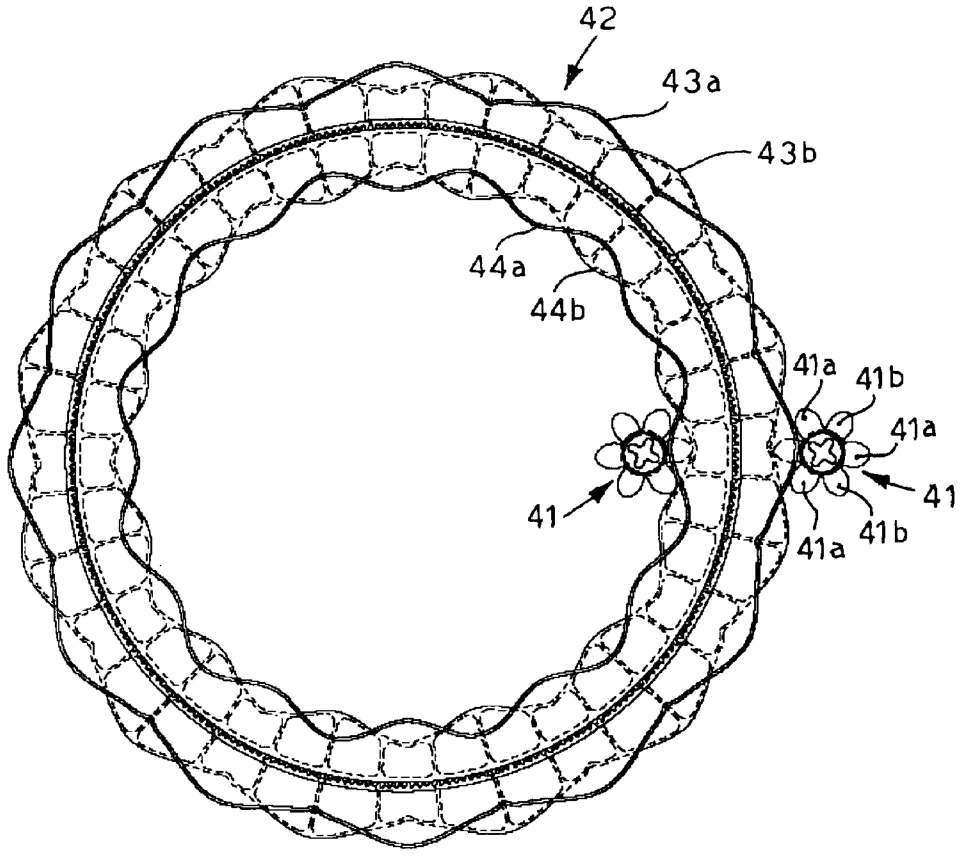
FIG. 10A is an enlarged view from above of a second detail of the delivery device in FIG. 1.
Figure 10B:
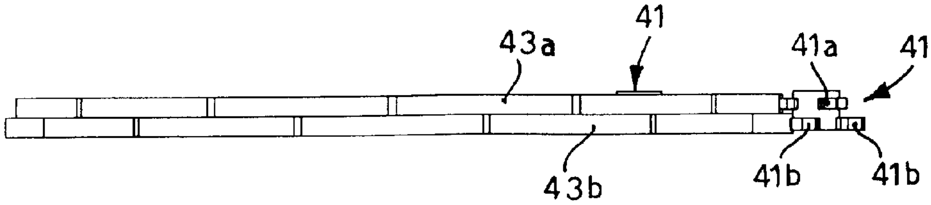
FIG. 10B is a lateral view of FIG. 9A.

With reference to FIGS. 10A, 10B, in which for clarity of illustration only the mixing cam element 42 and the butterflies 41 are shown, the external edge of the mixing cam element 42 is provided with a shaping that develops along its whole circumference in a circular curvilinear development having alternate concave and convex portions able to cooperate with the fins 41*a*, 41*b* of the butterfly elements 41 of the canisters 40 disposed more externally.

In this case, the shaping is provided with an upper shaping 43*a*, able to cooperate with the upper fins 41*a*, and a lower shaping 43*b* able to cooperate with the lower fins 41*b*. When the mixing cam element 42 is made to rotate, the shapings 43*a*, 43*b* allow to transmit a rotational motion, by means of the fins 41*a*, 41*b*, to each butterfly element 41 and hence to each mixing blade 46.

In a similar way, the internal edge of the mixing cam element 42 is provided with a shaping that develops along its whole circumference in a circular curvilinear development having alternate concave and convex portions able to cooperate with the fins 41*a*, 41*b* of the butterfly elements 41 of the canisters 40 disposed more internally on the table 18.

In this case, the shaping is provided with an upper shaping 44*a*, able to cooperate with the upper fins 41*a*, and a lower shaping 44*b* able to cooperate with the lower fins 41*b*, as previously described.

This allows to achieve an efficient and economical mechanism for mixing the colorant, independently of the rotation of the table 18.

The delivery unit 10 as described heretofore functions as follows.

After having positioned a container on the platform 16, depending on the type of formula or composition of the colorant to be obtained, and therefore on the specific sequence of quantities taken from a predetermined set of canisters among those available, the table 18 is made to rotate in one of the two directions indicated by "R" until the predetermined delivery unit 20 is positioned in correspondence with the platform 16.

During the rotation of the table, the arms 36 are rotated and disposed one above the other (FIG. 4B) so as not to interfere mechanically with the gear elements 27 of the delivery units 20. When the specific delivery unit 20 is disposed in proximity with the platform 16, the arms 36 are rotated so as to be disposed aligned horizontally and to engage with the gear element 27 (FIG. 4A) of the actuation cam element 30, in coordination with the stopping of the table 18.

Figure 6:
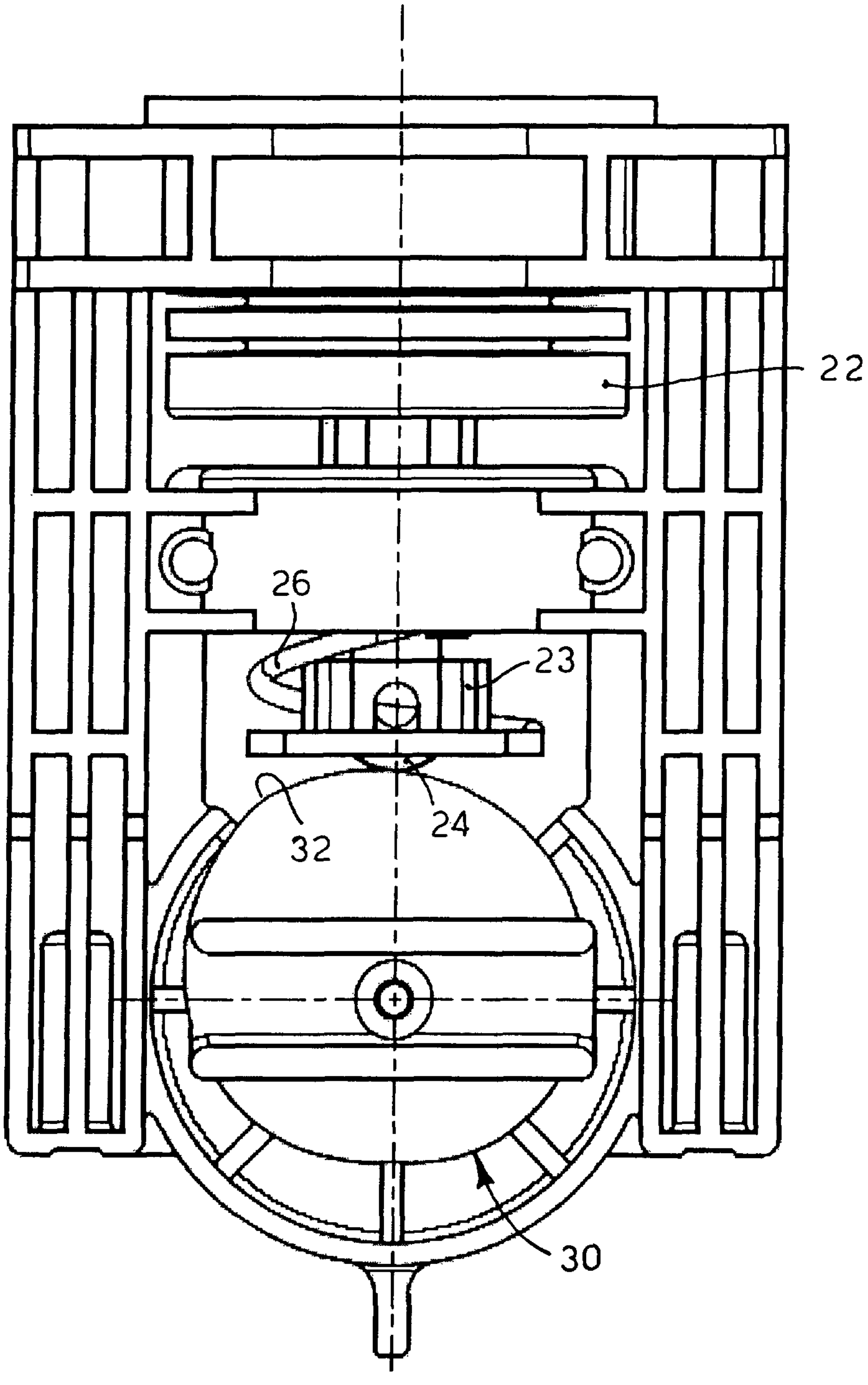
FIG. 6 is an enlarged view of the detail in FIG. 5 in a second operating condition.
Figure 7:
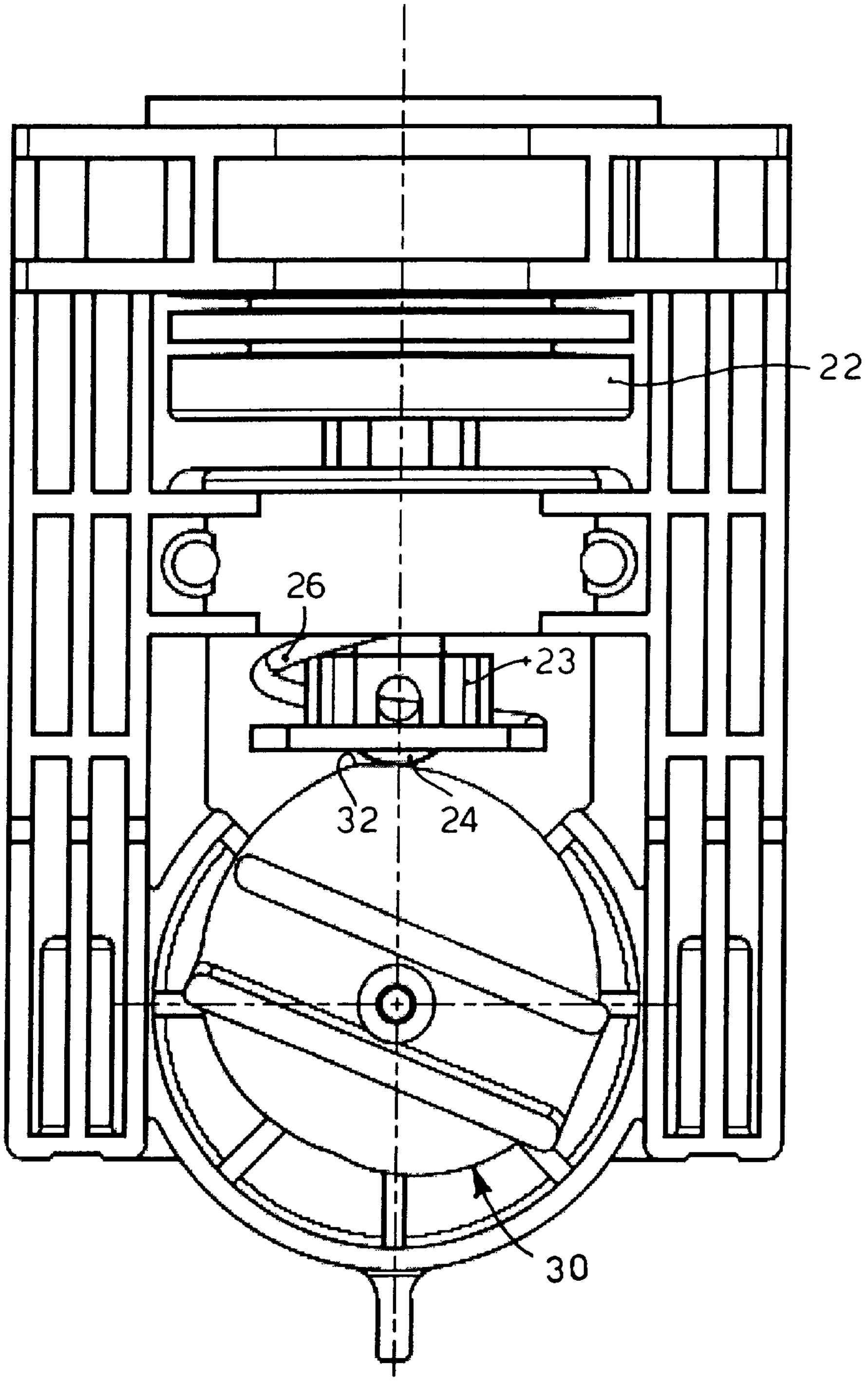
FIG. 7 is an enlarged view of the detail in FIG. 5 in a third operating condition.

The colorant, already located in the bellows pump 22 in the quantity required for the delivery, is delivered by making the arms 36 rotate and then the actuation cam element 30 rotates from its first position (FIG. 5) to a desired position, for example making it rotate by 180° (FIG. 6).

The rotation of the cam 30 determines the axial lifting of the transmission element 23 due to the effect of the contact of the wheel 24 with the eccentric profile of the actuation cam element 30 and therefore the compression of the bellows pump 22 and the delivery of the colorant through the delivery nozzle 21.

The transmission element is always kept in contact with the actuation cam element 30 due to the effect of the contrasting spring 26.

If the quantity to be delivered is a fraction more than the nominal capacity of the bellows pump 12, with the present invention it is possible to carry out another delivery of the colorant by making the actuation cam element 30 rotate further (FIG. 7), to an angular value for example of 195°, so as to engage the protuberance 23*a* with the wheel and further compress the bellows 22. The protuberance 23*a* is designed in such a way as to define a predetermined known portion or fraction of colorant to be delivered, allowing both to nominally increase the capacity of the bellows 22 and also to compensate possible offsets or deviations in the capacity of the delivery unit 20 that can occur after numerous delivery cycles.

Figure 4:
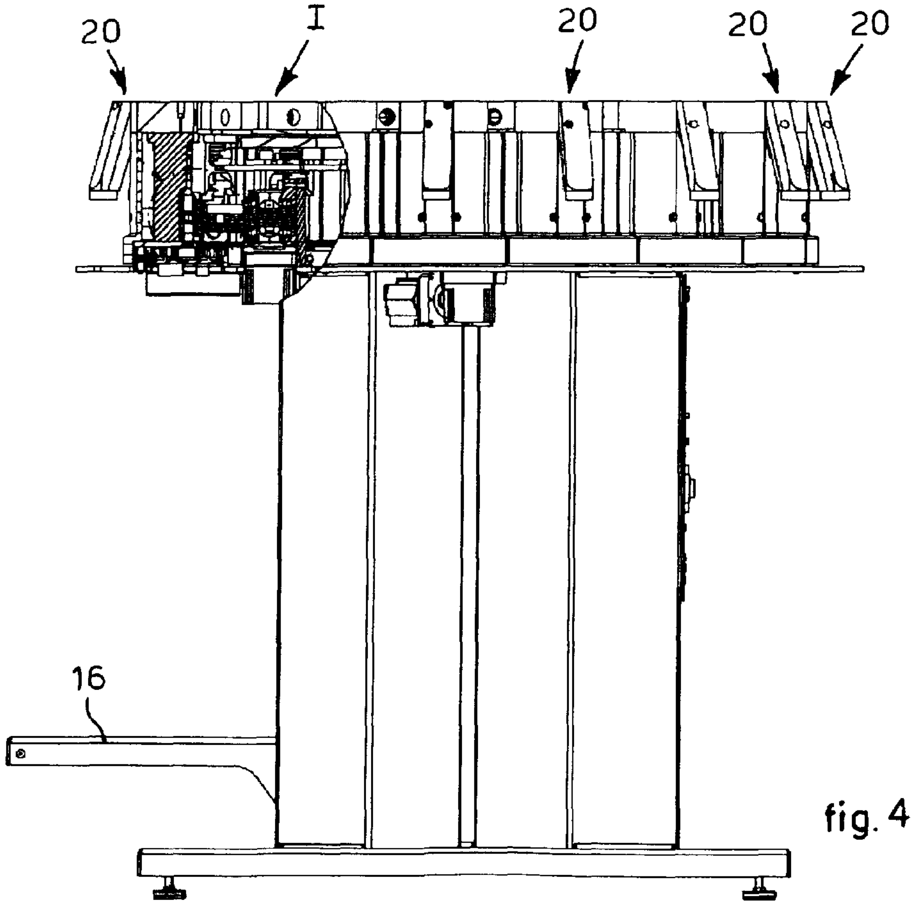
FIG. 4 is an enlarged lateral view of the delivery device in FIG. 1.
Figure 4A:
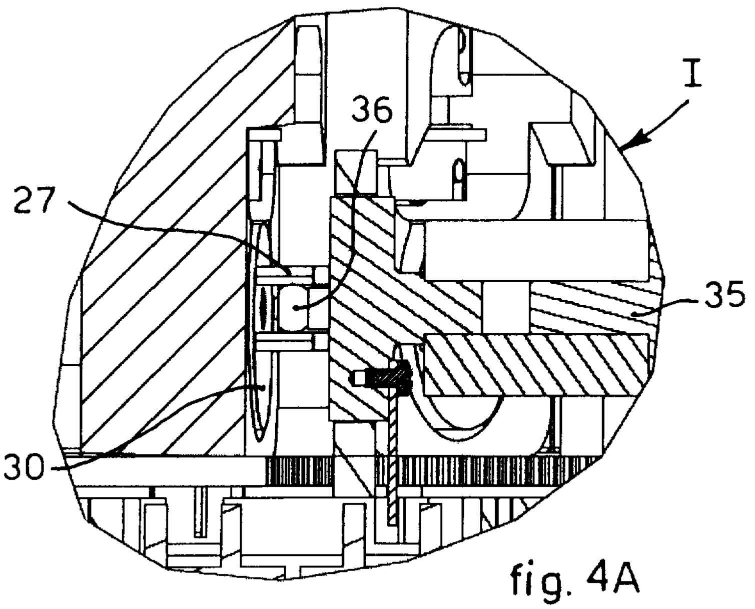
FIG. 4A is an enlarged view of a detail in FIG. 4 in a first operating condition.
Figure 4B:
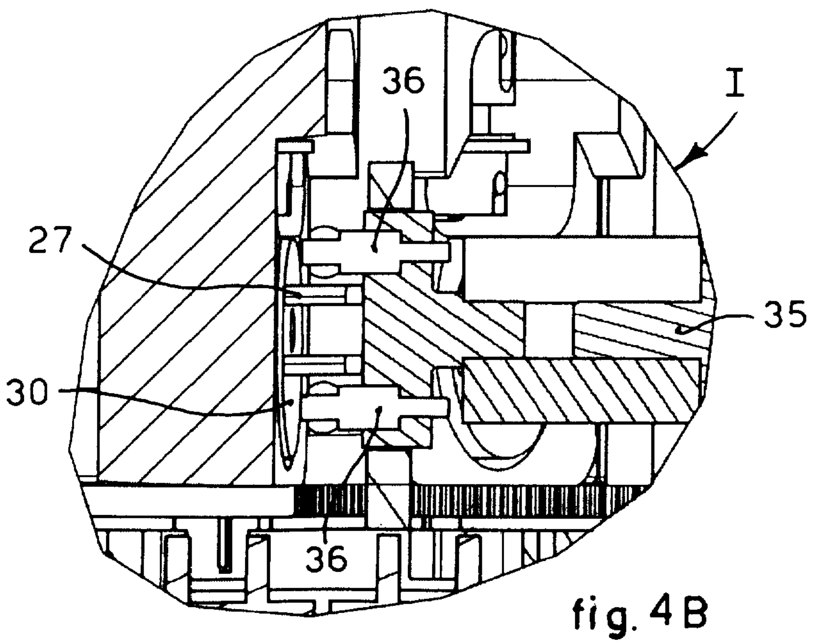
FIG. 4B is an enlarged view of the detail in FIG. 4A in a second operating condition.

At the end of delivery, the actuation cam element 30 is made to rotate alternatively in the opposite direction, stopping the delivery of the colorant and returning the cam 30 to its inactive position shown in FIG. 4. In this step it is possible to take in and load the colorant into the bellows 22 for a subsequent delivery step. The suction and delivery steps are repeated, making the cam 30 rotate alternatively in the two directions, until the desired quantity of colorant has been delivered.

Figure 8A:
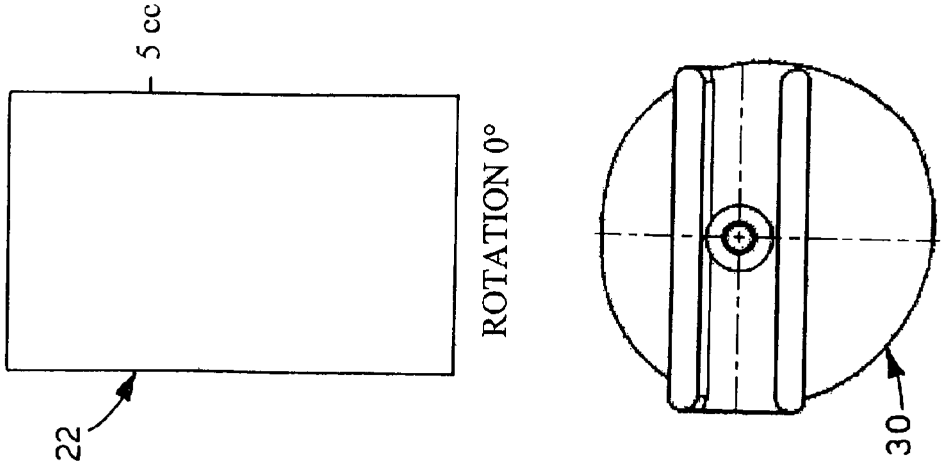
FIG. 8A, 8B & 8C are schematic representations of three conditions of the actuation cam element and the correspondent conditions of the bellows pump.
Figure 8B:
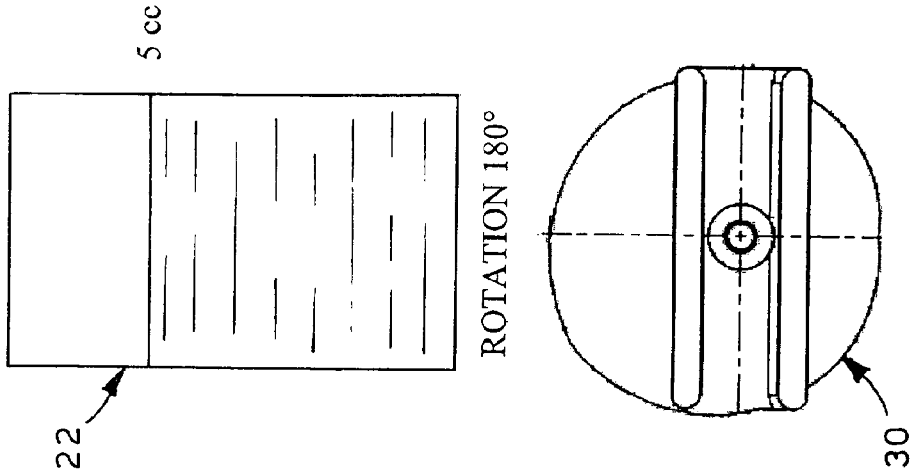
Figure 8C:
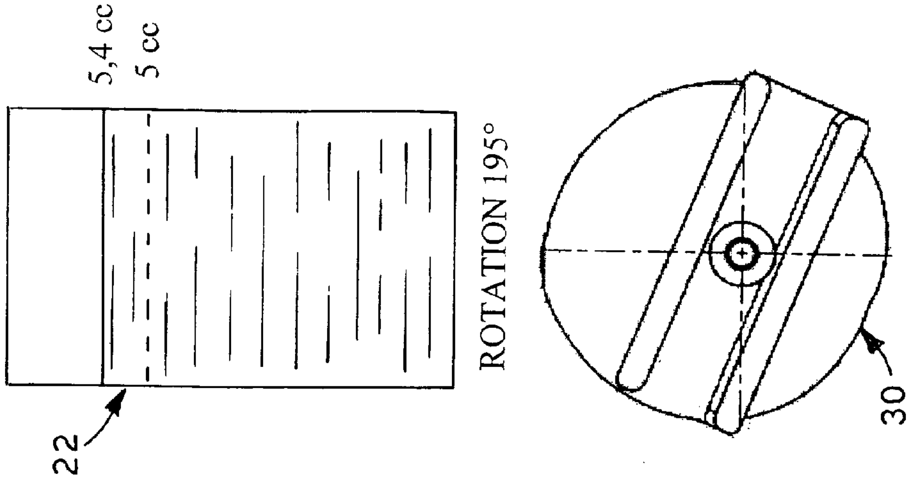

In the FIGS. 8A, 8B and 8C the conditions of the bellows pump 22 in a suction cycle have been represented, that correspond respectively to a first position of the actuation cam element 30 (bellows pump 22 empty), a second condition of the actuation cam element 30 rotated of 180° with respect to the first condition (bellows pump 22 filled with 5 cc of fluid product), and a third condition of the actuation cam element 30, rotated of further 15° with respect to the second condition, for a total of 195° with respect to the first condition, with the bellows pump 22 filled with 5.4 cc of fluid product in order to deliver a fraction of the nominal capacity of the bellows pump 22.

In order to keep the colorant contained in the canisters in efficient and optimum conditions, the mixing blades 46 are activated: in fact, when the rotating table 18 is stationary, the mixing cam element 42 is made to rotate by means of the associated actuation member so as to make each butterfly element 41, mechanically connected to the axis of rotation of the blades 46, rotate. In fact, the upper 41*a* and lower 41*b* fins, contacting respectively the upper 43*a* and lower 43*b* shapings of the external profile 43, and the upper 44*a* and lower 44*b* shapings of the external profile 44, according to the position of the relative canisters 40, determine the simultaneous rotation of all the blades 46.

In this way it is possible to achieve an effective mixing of all the colorants contained in the canisters, using a single actuation member, and therefore reducing the costs of the device and the probabilities of possible mechanical breakdowns.

The invention claimed is:

1. A device to deliver fluid products, comprising a plurality of canisters, each one able to contain a predetermined fluid, and connected to an associated delivery unit, each delivery unit comprising a bellows pump, alternatively drivable between a condition in which it sucks in the fluid from a corresponding canister and a condition in which it delivers the fluid, said delivery device also comprising actuator means able to cooperate directly or indirectly with each bellows pump in order to drive it between said suction condition and said delivery condition, said actuator means comprise an actuation cam element, rotatable alternatively in two opposite directions of rotation, and having a profile able to cooperate during its own rotation with the bellows pump, so as to define in a first direction of rotation said suction condition, and in the opposite direction of rotation said delivery condition, wherein said suction condition and said delivery condition are defined respectively by a rotation of 180° of the actuation cam element in the first direction of rotation and by a subsequent rotation of 180° in the opposite direction of rotation, wherein the actuation cam element comprises a shaped portion able to define, during its own rotation, an operating condition of extra travel with respect to positions which are rotated by 180° with respect to each other, wherein the bellows pump delivers predetermined fractions of fluid to compensate for operating and/or working deviations in the delivery capacity of the delivery unit.

2. The device as in claim 1, wherein said operating condition of extra travel comprises a further rotation by an angle between 15° and 30° over the limit positions which are rotated by 180° with respect to each other.

3. The device as in claim 1, wherein it comprises a rotating support, on which said plurality of canisters and said delivery units are mounted, able to position at different moments of time and according to one or more predetermined sequences, one or more desired and selected delivery units in a corresponding delivery position, in order to deliver predetermined quantities of fluid in an exit container so as to obtain a final product with a desired final composition and/or formula.

4. The device as in claim 1, wherein it comprises mixing means able to mix the fluids contained in the canisters and a movement member, able to move the mixing means.

5. The device as in claim 4, wherein said movement member comprises a mixing cam element, substantially circular, concentric to said rotating support and rotatable with respect to it, in at least a reciprocal condition of release between the rotating support and said mixing cam element, and wherein said mixing cam element is provided with at least a shaping able to cooperate, during its rotation, with all the mixing means of each canister, so that its activation in rotation determines the activation of all the mixing means of the fluid products inside all the canisters.

6. The device as in claim 5, wherein the mixing cam element is able to be activated when the rotating support is stationary, whilst when the rotating support is activated in order to position the canisters in a delivery position, the actuation cam element is solid with the rotating support in order to rotate with it.

7. The device as in claim 5, wherein said shaping develops on an external or internal peripheral edge, or on both edges, of said mixing cam element.

8. The device as in claim 5, wherein said shaping comprises a circular curvilinear development having alternate concave and convex portions able to cooperate with the mixing means.

9. The device as in claim 5, wherein the mixing cam element comprises a gear in its internal edge, or on an intermediate profile, able to engage selectively with a toothed wheel in order to activate the rotation thereof, independently from the rotation of the rotating support.

10. The device as in claim 1, wherein the canisters are made in modules, each module having a predetermined number of canisters and each module being made by molding in a single piece.

11. A method to deliver fluid products or suchlike, in which by means of a plurality of canisters, each one able to contain a predetermined fluid, and connected to an associated delivery unit provided with a bellows pump, said bellows pump being alternatively drivable between a condition in which it sucks in the fluid from the corresponding canister, and a condition in which it delivers the fluid, and by means of actuator means each bellows pump is driven between said suction condition and said delivery condition in order to deliver predetermined quantities of fluid, wherein an actuation cam element of said actuator means is made to rotate alternatively in two opposite directions of rotation, so that a profile thereof cooperates during its own rotation with the bellows pump, so as to define in a first direction of rotation said suction condition and in the opposite direction of rotation said delivery condition, wherein said suction condition and said delivery condition are defined respectively by a rotation of 180° of the actuation cam element in the first direction of rotation and by a subsequent rotation of 180° in the opposite direction of rotation, and wherein it provides a step in which the actuation cam element is made to rotate to an operating condition of extra travel of the bellows pump in order to deliver predetermined fractions of fluid and/or to compensate for operating and/or working deviations of the delivery capacity of the delivery unit.

12. A method as in claim 11, wherein the canisters and the delivery units are mounted on a rotating support to position at different moments of time and according to one or more predetermined sequences, one or more desired and selected delivery units in a corresponding delivery position, in order to deliver predetermined quantities of fluid in an exit container so as to obtain a final product with a desired final composition and/or formula.

13. The method as in claim 11, wherein the fluids contained in the canisters are mixed by mixing means, said mixing means being moved by means of a movement member.

14. The method as in claim 13, wherein said movement member comprises a mixing cam element, substantially circular, concentric to said rotating support and rotatable with respect thereto, in at least a reciprocal condition of release of the rotating support and said mixing cam element, and wherein said mixing cam element is provided with at least a shaping able to cooperate, during its rotation, with all the mixing means of each canister, so that its activation in rotation determines the activation of all the mixing means of the fluid products inside all the canisters.

15. The method as in claim 14, wherein the mixing cam element is able to be activated when the rotating support is stationary, whilst when the rotating support is activated in order to position the canisters in a delivery position, the mixing cam element is solid with the rotating support so as to rotate with it.

16. The method as in claim 14, wherein the mixing cam element, by means of the selective engagement with a toothed wheel, is made to rotate independently from the rotation of the rotating support.

* * * * *